United States Patent
Grah et al.

(10) Patent No.: US 7,424,636 B1
(45) Date of Patent: Sep. 9, 2008

(54) METHOD AND APPARATUS FOR CONTROLLING A CLOCK SIGNAL OF A LINE CARD CIRCUIT

(75) Inventors: Adrian Grah, Kanata (CA); Steven G. Driediger, Kanata (CA); John S. Gryba, Ottawa (CA); Michel Rochon, Kanata (CA)

(73) Assignee: Alcatel Lucent, Paris (FR)

( * ) Notice: Subject to any disclaimer, the term of this patent is extended or adjusted under 35 U.S.C. 154(b) by 1574 days.

(21) Appl. No.: 09/636,115

(22) Filed: Aug. 10, 2000

(51) Int. Cl.
*G06F 1/04* (2006.01)
(52) U.S. Cl. .................................. 713/600; 713/500
(58) Field of Classification Search ............... 713/400, 713/401, 500, 600, 601, 501; 370/503
See application file for complete search history.

(56) References Cited

U.S. PATENT DOCUMENTS

| | | | | |
|---|---|---|---|---|
| 4,366,540 A | * | 12/1982 | Berglund et al. | 713/501 |
| 5,297,276 A | * | 3/1994 | Millar et al. | 713/601 |
| 5,452,434 A | * | 9/1995 | MacDonald | 713/601 |
| 5,457,801 A | * | 10/1995 | Aihara | 713/322 |
| 5,648,953 A | * | 7/1997 | Kim | 369/124.07 |
| 5,789,952 A | * | 8/1998 | Yap et al. | 327/114 |
| 5,850,541 A | * | 12/1998 | Sugimoto | 713/601 |
| 5,870,595 A | * | 2/1999 | Oki | 713/601 |
| 5,881,135 A | * | 3/1999 | Watts et al. | 379/88.02 |
| 5,914,580 A | * | 6/1999 | Senoh | 318/696 |
| 6,167,062 A | * | 12/2000 | Hershey et al. | 370/503 |
| 6,323,705 B1 | * | 11/2001 | Shieh et al. | 327/158 |
| 6,401,213 B1 | * | 6/2002 | Jeddeloh | 713/401 |
| 6,643,791 B1 | * | 11/2003 | Teodorescu | 713/500 |

FOREIGN PATENT DOCUMENTS

| | | | |
|---|---|---|---|
| JP | 63-73717 | * | 4/1988 |
| JP | 64-48142 | * | 2/1989 |
| JP | 10-117190 | * | 5/1998 |
| JP | 10-209865 | * | 8/1998 |

* cited by examiner

*Primary Examiner*—Chun Cao

(57) ABSTRACT

A method and apparatus for handling, maintaining, and controlling network synchronization information emanating from a plurality of line card circuits is described. The technique described may be applied to a redundant pair of line card circuits, where one line card circuit is active, while the other is inactive. Line card activity latches are managed by means of hardware logic that may be configured at the time of line card commissioning. The activity latches are coupled to a logic element. An incoming clock signal is applied to the logic element. If an activity latch indicates that a line card circuit is active, the logic element provides the incoming clock signal as an outgoing clock signal to a control card circuit. If the activity latch indicates that the line card circuit is inactive, the logic element blocks the incoming clock signal from being passed and provides a static output level as the outgoing clock signal to the control card circuit. The control card circuit is provided with circuitry to receive the outgoing clock signals from multiple line card circuits. The circuitry is sensitive to whether or not the line card circuits are configured for redundant operation. One or more of these clock signals are then selected and used for network synchronization.

8 Claims, 6 Drawing Sheets

US 7,424,636 B1

METHOD AND APPARATUS FOR CONTROLLING A CLOCK SIGNAL OF A LINE CARD CIRCUIT

TECHNICAL FIELD OF THE INVENTION

The invention relates generally to data networks and, more specifically, to network system synchronization.

BACKGROUND OF THE INVENTION

In a network, data passes through network nodes. The network nodes allow data to be routed to their destinations. Such network nodes often include a plurality of line cards and one or more control cards. The line cards are coupled to a plurality of lines, while the control cards control the line cards.

In the past, the control of line cards relied heavily on execution of software. Both the line cards and the control cards contained processors that executed the software. The action of transitioning a line card from an active state to an inactive state and transitioning another line card from the inactive state to the active state raised a number of issues. One issue is that all of the software entities of the different components needed to communicate to each other that a line card redundancy switch was in progress. Software needed to be executed on a control card to determine how to deselect the timing information from the first line card and select timing information from the second line card. The software used to deselect and select timing information has generally been complex, and its execution has required a significant amount of time during which the reference signal was indeterminate. Such indeterminate signals have compromised the quality of the reference signal in the control card, introducing effects such as jitter.

Thus, a method and apparatus is needed to reduce the time and complexity previously required to change a source of timing information when transitioning between activation of multiple line cards. Such a method and apparatus is needed to avoid degradation of network synchronization that can result from the previous techniques.

DETAILED DESCRIPTION OF A PREFERRED EMBODIMENT

A method and apparatus for handling, maintaining, and controlling network synchronization information emanating from a plurality of line card circuits is described. The technique described may be applied to a redundant pair of line card circuits, where one line card circuit is active, while the other is inactive. Line card activity latches are managed by means of hardware logic that may be configured at the time of line card commissioning. The activity latches are coupled to a logic element. An incoming clock signal is applied to the logic element. If an activity latch indicates that a line card circuit is active, the logic element provides the incoming clock signal as an outgoing clock signal to a control card circuit. If the activity latch indicates that the line card circuit is inactive, the logic element blocks the incoming clock signal from being passed and provides a static output level as the outgoing clock signal to the control card circuit. The control card circuit is provided with circuitry to receive the outgoing clock signals from multiple line card circuits. The circuitry is sensitive to whether or not the line card circuits are configured for redundant operation.

Figure 1:
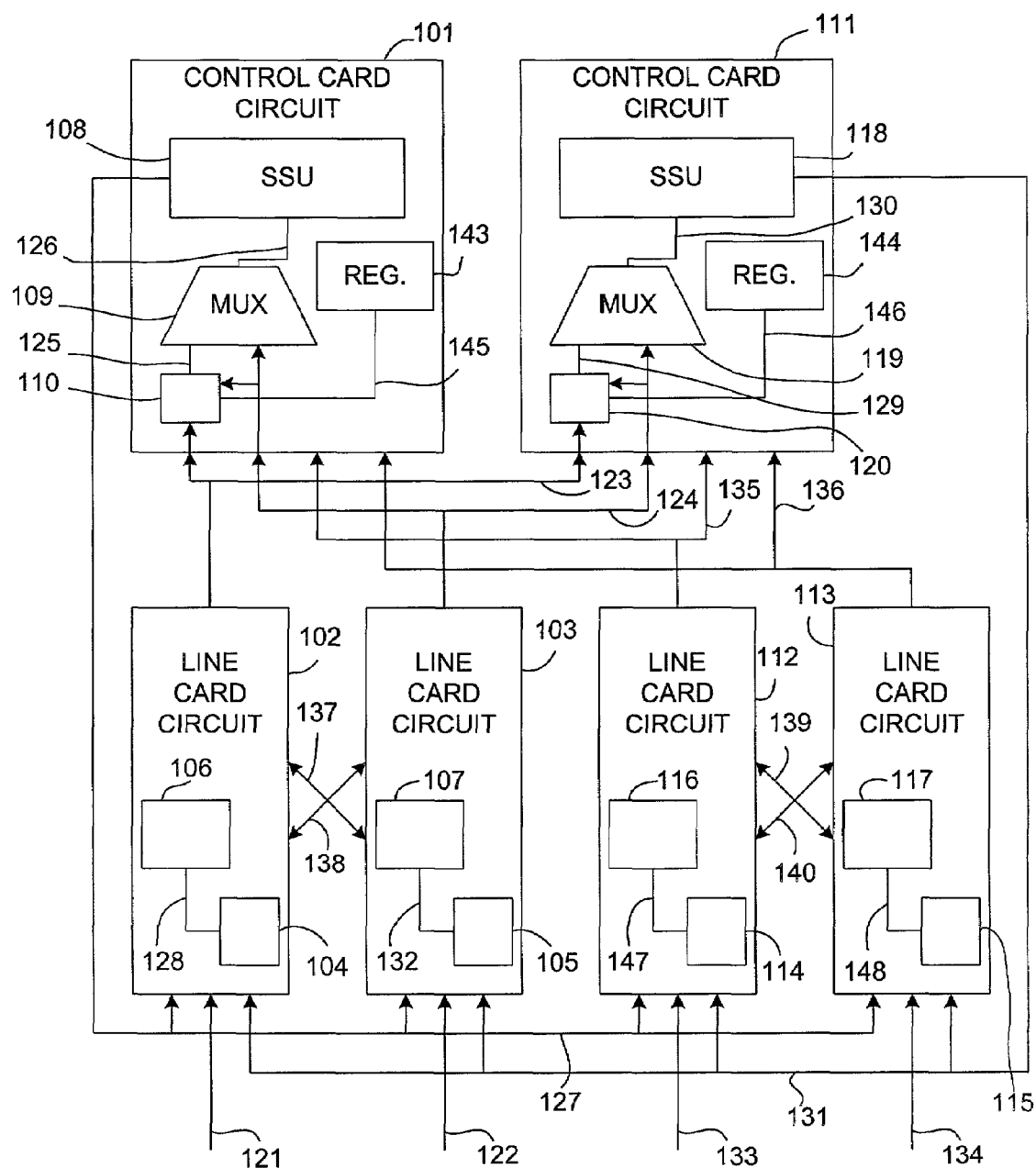
FIG. 1 is a block diagram illustrating a network node comprising a plurality of control card circuits and a plurality of line card circuits in accordance with an embodiment of the present invention.

FIG. 1 is a block diagram illustrating a network node comprising a plurality of control card circuits and a plurality of line card circuits in accordance with an embodiment of the present invention. The network node includes control card circuit 101, line card circuit 102, line card circuit 103, control card circuit 111, line card circuit 112, and line card circuit 113. An incoming clock signal 121 is provided to line card circuit 102. An incoming clock signal 122 is provided to line card circuit 103.

Line card circuit 102 includes activity latch 104 and logic element 106. Activity latch 104 is coupled to logic element 106 via coupling 128. Line card circuit 103 includes activity latch 105 and logic element 107. Activity latch 105 is coupled to logic element 107 via coupling 132. Line card circuit 102 is coupled to line card circuit 103 via couplings 137 and 138. Line card circuit 102 provides an outgoing clock signal 123 to control card circuit 101 and to control card circuit 111. Line card circuit 103 provides an outgoing clock signal 124 to control card circuit 101 and to control card circuit 111.

Line card circuit 112 includes activity latch 114 and logic element 116. Activity latch 114 is coupled to logic element 116 via coupling 147. Line card circuit 113 includes activity latch 115 and logic element 117. Activity latch 115 is coupled to logic element 117 via coupling 148. Line card circuit 112 is coupled to line card circuit 113 via couplings 139 and 140. Line card circuit 112 receives incoming clock signal 133 and provides outgoing clock signal 135 to control card circuit 101 and control card circuit 111. Line card circuit 113 receives incoming clock signal 134 and provides outgoing clock signal 136 to control card circuit 101 and control card circuit 111.

Outgoing clock signal 123 is provided to a first clock input of control card circuit 101. The first clock input is coupled to logic circuit 110. Logic circuit 110 provides a clock signal 125 to multiplexer 109. Redundancy configuration register 143 is coupled via coupling 145 to logic circuit 110. Outgoing clock signal 124 of line card circuit 103 is coupled to logic circuit 110 and multiplexer 109 of control card circuit 101. Multiplexer 109 is coupled to the system synchronization unit (SSU) 108 via coupling 126. SSU 108 provides a master clock signal 127 to line card circuits 102, 103, 112, and 113.

Outgoing clock signal 123 of line card circuit 102 is coupled to logic circuit 120 of control card circuit 111. Logic circuit 120 provides a clock signal 129 to multiplexer 119. Redundancy configuration register 144 is coupled via coupling 146 to logic circuit 120. Line card circuit 103 provides an outgoing clock signal 124 to logic element 120 and multiplexer 119 of control card circuit 111. Multiplexer 119 is coupled to SSU 118 via coupling 130. SSU 118 provides a master clock signal 131 to line card circuits 102, 103, 112, and 113.

Figure 2:
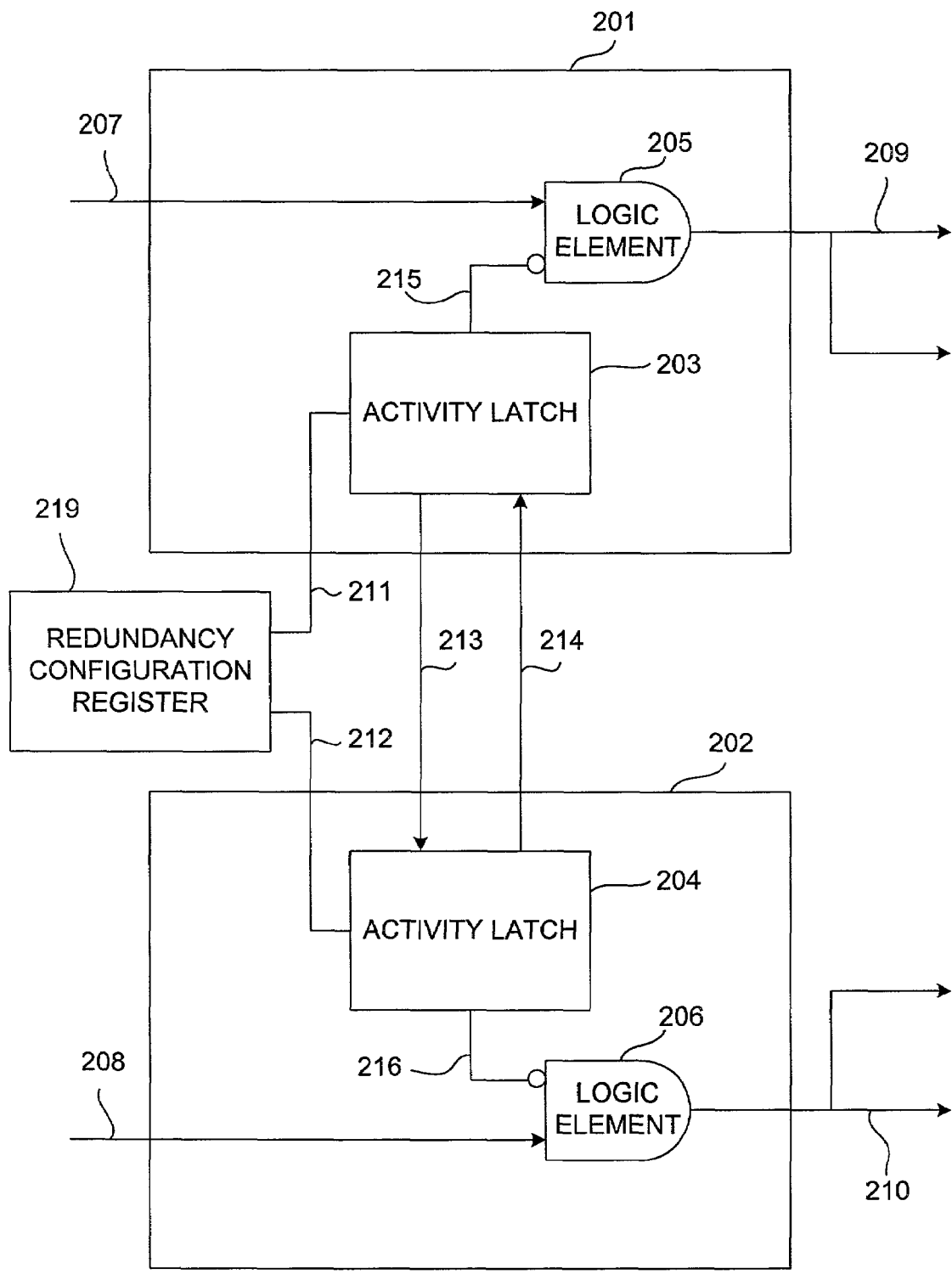
FIG. 2 is a block diagram illustrating a plurality of line card circuits in accordance with an embodiment of the invention.

FIG. 2 is a block diagram illustrating a plurality of line card circuits in accordance with an embodiment of the invention. Line card circuit 201 includes activity latch 203 and logic element 205. Logic element 205 receives incoming clock signal 207. Activity latch 203 is coupled to logic element 205 and provides activity signal 215 to logic element 205. Logic element 205 provides outgoing clock signal 209 to one or more control card circuits.

Line card circuit 202 includes activity latch 204 and logic element 206. Logic element 206 receives incoming clock signal 208. Activity latch 204 is coupled to logic element 206 and provides activity signal 216 to logic element 206. Logic element 206 provides outgoing clock signal 210 to one or more control card circuits.

Logic elements 205 and 206 may be combinational logic elements. For example, as illustrated, logic elements 205 and 206 may be AND gates with one inverted input, or alternatively, regular AND gates with an inverter interposed between the corresponding activity latch and the AND gate input. As can be appreciated by one skilled in logic design, the configuration of the logic elements and the nature of the signals applied to them may be implemented in other ways. For example, if the states of the activity latches were inverted, the inversion of the AND gate inputs coupled to the activity latches would be obviated. Thus, logic elements 205 and 206 may be implemented as appropriate for a specific embodiment of the invention.

Redundancy configuration register 219 is coupled to activity latch 203 via coupling 211 and to activity latch 204 via coupling 212. Activity latch 203 is coupled to activity latch 204 via couplings 213 and 214. Couplings 213 and 214 may be used to assure that the activity latches 203 and 204 contain activity flag values that are mutually exclusive.

Figure 3:
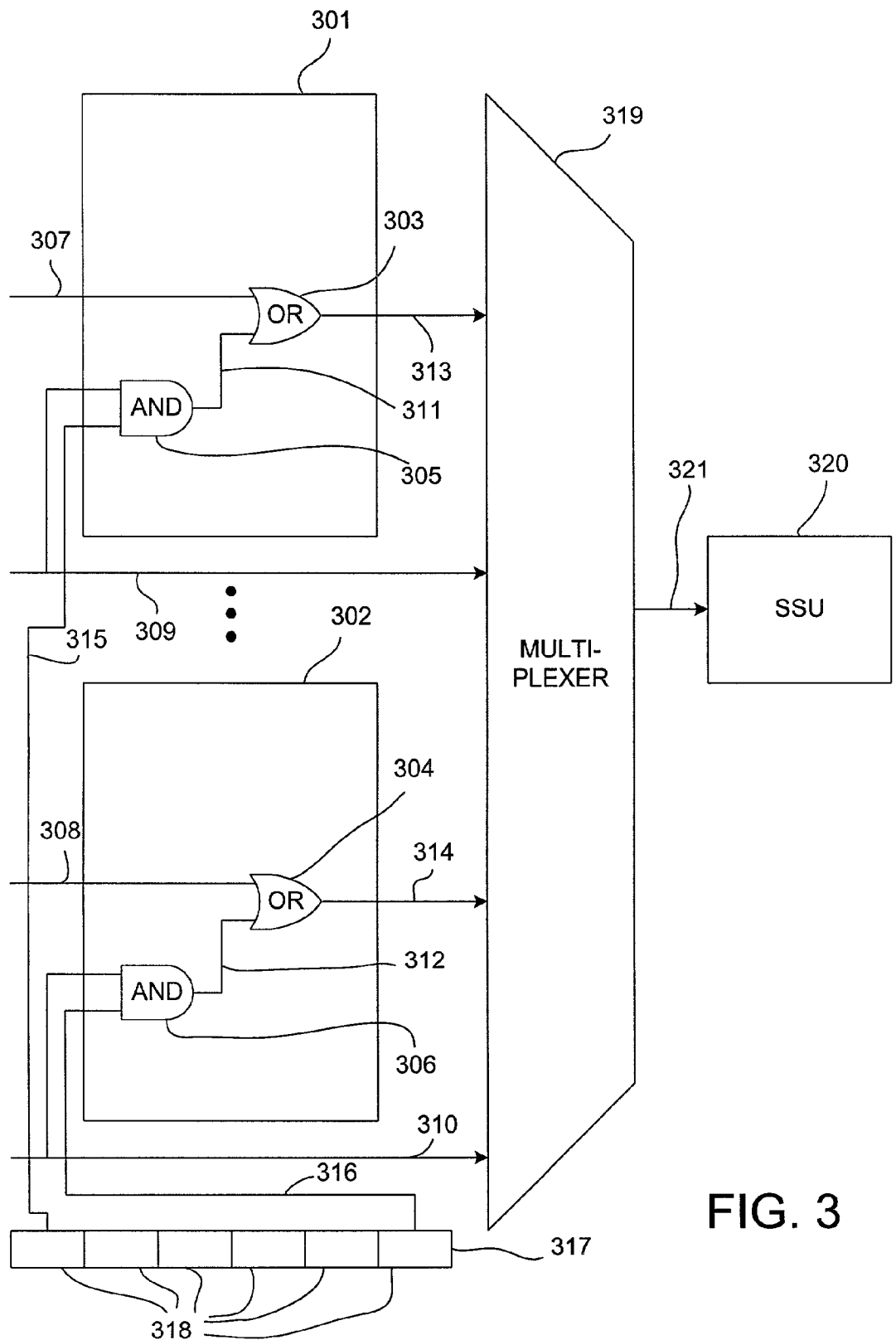
FIG. 3 is a block diagram illustrating a control card circuit in accordance with an embodiment of the present invention.

FIG. 3 is a block diagram illustrating a control card circuit in accordance with an embodiment of the present invention. The control card circuit includes logic circuit 301 and logic circuit 302. Logic circuits 301 and 302 may be combinational logic circuits. The control card circuit also includes multiplexer 319, SSU 320, and redundancy configuration register 317. Combinational logic circuit 301 includes AND gate 305 and OR gate 303. Logic circuit 302 includes AND gate 306 and OR gate 304. Clock input 307 is coupled to a first input of OR gate 303. Clock input 309 is coupled to a first input of AND gate 305. A first output of redundancy configuration register 317 is coupled to a second input 315 of AND gate 305. AND gate 305 is coupled to a second input of OR gate 303 via coupling 311. OR gate 303 provides clock signal 313 to multiplexer 319. Clock input 309 is also coupled to multiplexer 319.

Clock input 308 is coupled to a first input of OR gate 304. Clock input 310 is coupled to a first input of AND gate 306 and to multiplexer 319. A second input of redundancy configuration register 317 is coupled to a second input 316 of AND gate 306. AND gate 306 is coupled to a second input of OR gate 304 via coupling 312. OR gate 304 provides clock signal 314 to multiplexer 319. Clock input 310 is also coupled to multiplexer 319.

Multiplexer 319 selects among clock input 309 and clock signal 313 and similar clock signals and clock inputs from other sets of redundant or non-redundant line cards (for example, clock signal 314 and clock input 310). Based on this selection, multiplexer 319 provides clock signal 321 to SSU 320. Redundancy configuration register 317 stores a plurality of redundancy configuration flag values 318, providing a first redundancy configuration flag value at its first output and a second redundancy configuration flag value at its second output.

While logic circuit 301 is illustrated as including AND gate 305 coupled to OR gate 303, and logic circuit 302 is illustrated as including AND gate 306 coupled to OR gate 304, logic circuits 301 and 302 may be implemented using any appropriate logic, for example, any appropriate combinational logic, for a specific embodiment of the invention. Logic circuits 301 and 302 pass a specific clock input, for example, clock inputs 307 and 308, respectively, when the corresponding redundancy configuration flag values indicate a non-redundant configuration. Logic circuits 301 and 302 select among multiple clock inputs, for example clock inputs 307 and 309 for logic circuit 301 and clock inputs 308 and 310 for logic circuit 302 when the corresponding redundancy configuration flag values indicate a redundant configuration. The selection among the multiple clock inputs is simplified by using line card circuits such as those illustrated in FIG. 2, which inhibit emission of an outgoing clock signal from an inactive line card circuit of a plurality of redundant line card circuits. By using such line card circuits, the selection may be performed with a simple logic gate, for example, an OR gate, an AND gate, a NAND gate, a NOR gate, or an XOR (exclusive OR) gate, or a combination thereof.

Figure 4:
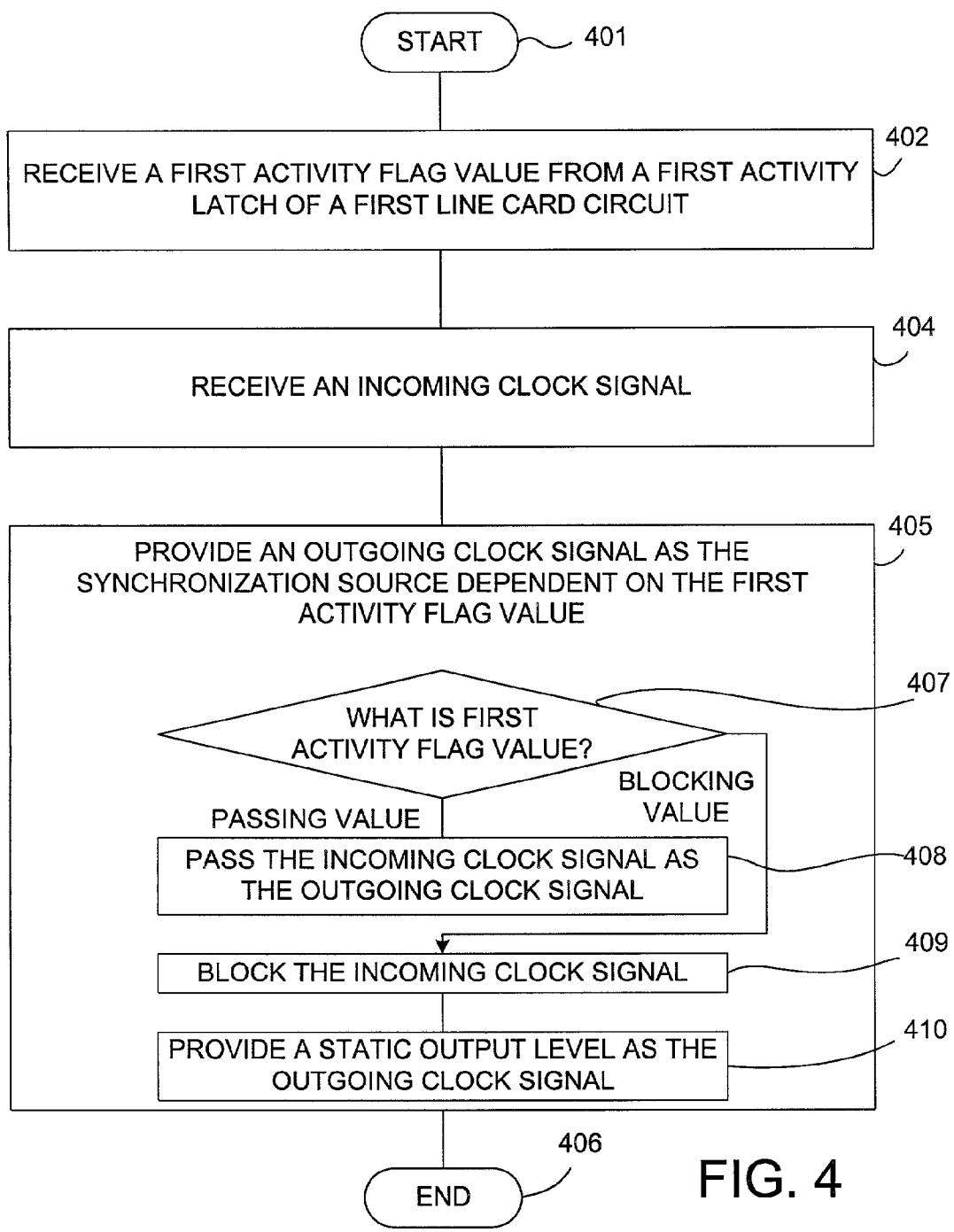
FIGS. 4 and 5 are flow diagrams illustrating a method for selecting a synchronization source among the plurality of line card circuits in accordance with an embodiment of the present invention.
Figure 5:
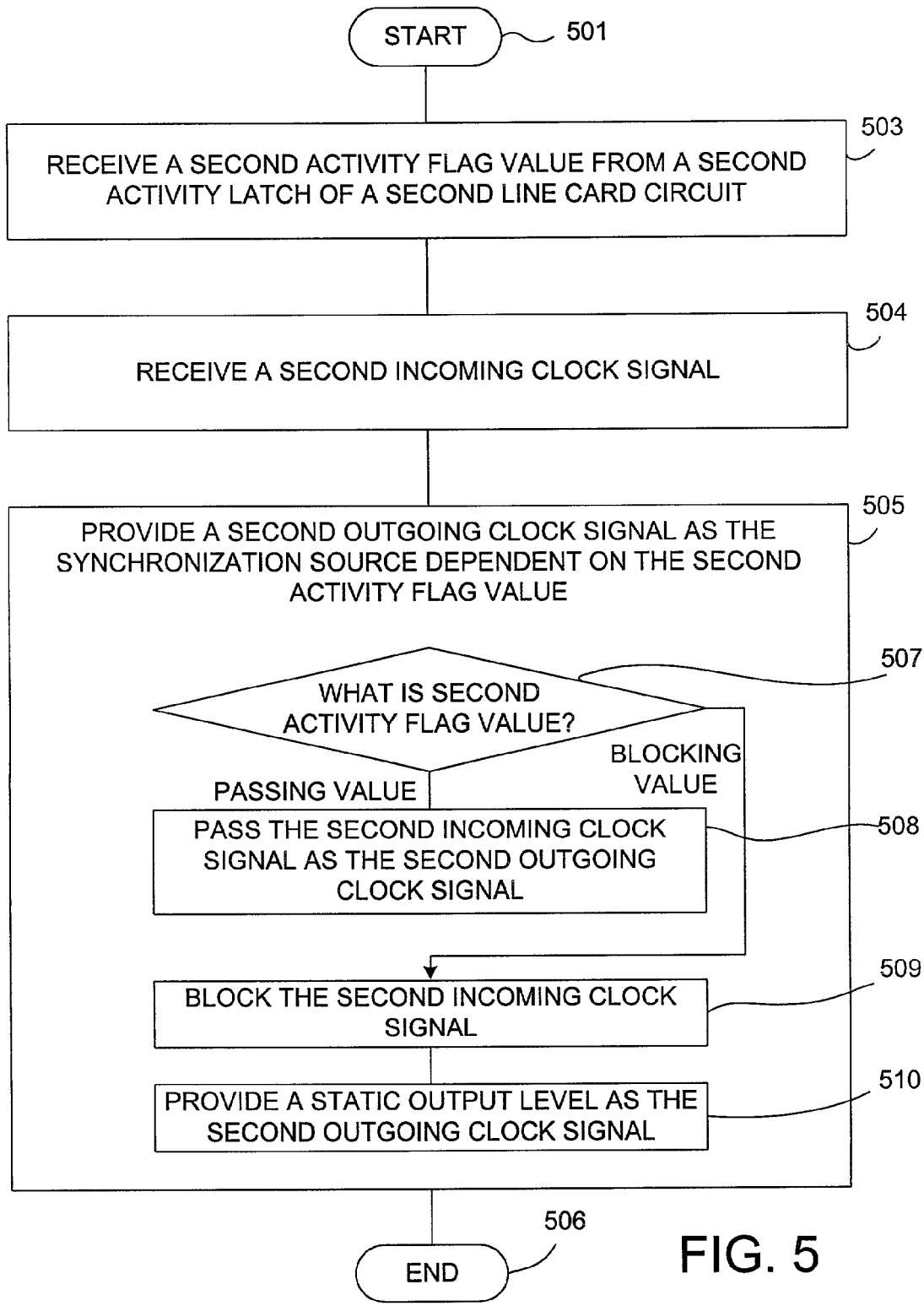

FIGS. 4 and 5 are flow diagrams illustrating a method for selecting a synchronization source among the plurality of line card circuits in accordance with an embodiment of the present invention. In FIG. 4, the process begins in step 401 and continues to step 402. In step 402, a first activity flag value is received from a first activity latch of a first line card circuit of a plurality of line card circuits.

In step 404, an incoming clock signal is received. In step 405, an outgoing clock signal is provided as the synchronization source dependent on the first activity flag value. Step 405 may include steps 407, 408, 409, and 410. In step 407, a determination is made as to what the first activity flag value is. The first activity flag may have a passing value or a blocking value which may, for example, be represented using a binary indication. If the first activity flag value has a passing value, the process continues to step 408. In step 408, the incoming clock signal is passed as the outgoing clock signal. If, in step 407, it is determined that the first activity flag value has a blocking value, the process continues to step 409. In step 409, the incoming clock signal is blocked when the first activity flag value has a second value. From step 409, the process continues to step 410. In step 410, a static output level is provided as the outgoing clock signal. From step 405, the process continues to step 406. The process ends in step 406.

In FIG. 5, the process begins in step 501 and continues to step 503. In step 503, a second activity flag value is received from a second activity latch of a second line card circuit of the plurality of line card circuits. The second activity flag value is mutually exclusive of the first activity flag value.

In step 504, a second incoming clock signal is received. In step 505, a second outgoing clock signal is provided as the synchronization source dependent on the second activity flag value. Step 505 may include steps 507, 508, 509, and 510. In step 507, a determination is made as to what the first activity flag value is. The second activity flag may have a passing value or a blocking value which may, for example, be represented using a binary indication. If the first activity flag value has a passing value, the process continues to step 508. In step 508, the second incoming clock signal is passed as the second outgoing clock signal. If, in step 507, it is determined that the first activity flag value has a blocking value, the process continues to step 509. In step 509, the second incoming clock signal is blocked when the second activity flag value has a blocking value. From step 509, the process continues to step 510. In step 510, a static output level is provided as the second outgoing clock signal. From step 505, the process continues to step 506. The process ends in step 506.

Figure 6:
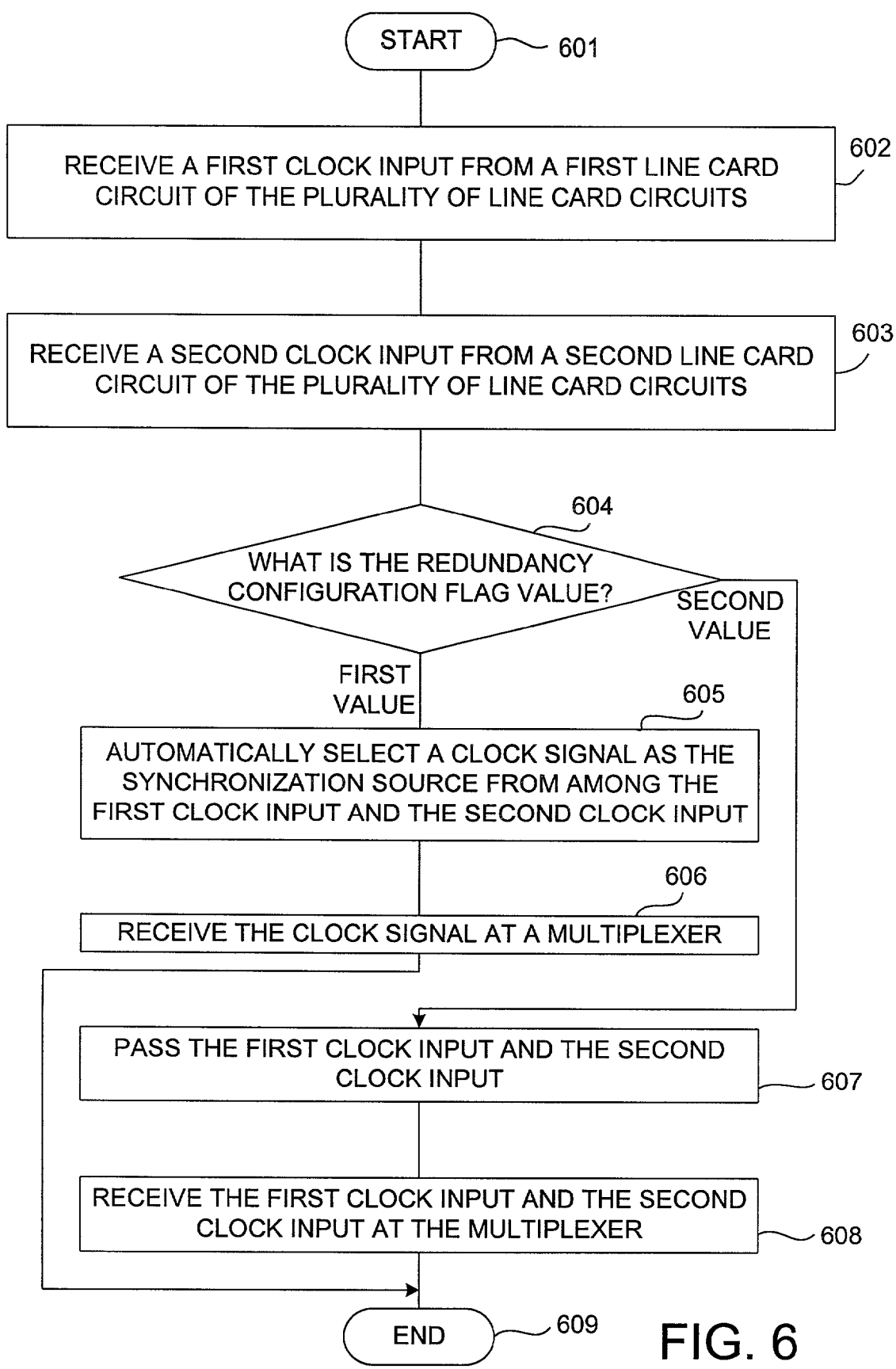
FIG. 6 is a flow diagram illustrating a process for selecting a synchronization source among a plurality of line card circuits in accordance with an embodiment of the present invention.

FIG. 6 is a flow diagram illustrating a process for selecting a synchronization source among a plurality of line card circuits in accordance with an embodiment of the present invention. The process begins in step 601 and continues to step 602. In step 602, a first clock input is received from a first line card circuit of the plurality of line card circuits. In step 603, a second clock input is received from a second line card circuit of the plurality of line card circuits. In step 604, a determination is made as to whether the redundancy configuration flag value has a first value or a second value. If the redundancy configuration flag value has a first value, the process continues to step 605. In step 605, a clock signal is automatically selected as the synchronization source from among the first clock input and the second clock input. From step 605 the process continues to step 606. In step 606, the clock signal is received in a multiplexer.

If, in step 604, the redundancy configuration flag value is determined to have a second value, the process continues to step 607. In step 607, the first clock input and the second clock input are passed through the logic circuit. From step 607, the process continues to step 608. In step 608, the first clock input and the second clock input are received at the multiplexer. From either of steps 606 or 608, the process continues to step 609. The process ends in step 609.

Accordingly, a method and apparatus for managing network synchronization information among multiple line cards has been described. It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A line card circuit comprising:

an activity latch for holding an activity flag value, wherein the activity flag value is mutually exclusive with a second activity flag value held in a second activity latch of a second line card circuit; and a logic element operatively coupled to the activity latch to receive an incoming clock signal and to provide an outgoing clock signal, the outgoing clock signal being dependent on the activity flag value.

2. The line card circuit of claim 1 wherein the logic element passes the incoming clock signal as the outgoing clock signal when the activity flag value has a first value.

3. The line card circuit of claim 2 wherein the logic element blocks the incoming clock signal when the activity flag value has a second value.

4. The line card circuit of claim 3 wherein the logic element provides a static output level as the output clock signal when the activity flag value has the second value.

5. A method for selecting a synchronization source among a plurality of line card circuits comprising the steps of:

receiving a first activity flag value from a first activity latch of a first line card circuit of the plurality of line card circuits;

receiving an incoming clock signal;

providing an outgoing clock signal as the synchronization source dependent on the first activity flag value; and receiving a second activity flag value from a second activity latch of a second line card circuit of the plurality of line card circuits, the second activity flag value being mutually exclusive of the first activity flag value.

6. The method of claim 5 wherein the step of providing the outgoing clock signal as the synchronization source dependent on the first activity flag value further comprises the step of:

passing the incoming clock signal as the outgoing clock signal when the first activity flag value has a passing value.

7. The method of claim 5 wherein the step of providing the outgoing clock signal as the synchronization source dependent on the first activity flag value further comprises the step of:

blocking the incoming clock signal when the first activity flag value has a blocking value.

8. The method of claim 7 wherein the step of providing the outgoing clock signal as the synchronization source dependent on the first activity flag value further comprises the step of:

providing a static output level as the outgoing clock signal when the first activity flag value has a blocking value.

* * * * *